United States Patent
Doi et al.

(10) Patent No.: US 8,416,185 B2
(45) Date of Patent: Apr. 9, 2013

(54) OPERATIONAL OBJECT CONTROLLING DEVICE, SYSTEM, METHOD AND PROGRAM

(75) Inventors: Jun Doi, Yokohama (JP); Kaori Fujiwara, Kawasaki (JP); Michiaki Tatsubori, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 12/428,523

(22) Filed: Apr. 23, 2009

(65) Prior Publication Data

US 2009/0267894 A1 Oct. 29, 2009

(30) Foreign Application Priority Data

Apr. 23, 2008 (JP) ................................. 2008-113241

(51) Int. Cl.
G09G 5/00 (2006.01)
(52) U.S. Cl.
USPC ........................................................ 345/156
(58) Field of Classification Search .................. 345/156; 250/492.22
See application file for complete search history.

(56) References Cited

U.S. PATENT DOCUMENTS 7,049,608 B2 * 5/2006 Yamaguchi et al. ..... 250/492.22

FOREIGN PATENT DOCUMENTS

| JP | 2001-276291 A2 | 10/2001 |
| JP | 2002-042168 A2 | 2/2002 |
| JP | 2005-297095 A2 | 10/2005 |

* cited by examiner

*Primary Examiner* — Fred Tzeng
(74) *Attorney, Agent, or Firm* — Vazken Alexanian

(57) ABSTRACT

An operational object controlling device including a motion detection unit, a motion obtaining unit, a motion feature quantities extraction unit, a template storage unit, an operational object motion storage unit, a motion feature quantities transform unit and an operational object motion obtaining unit. The motion obtaining unit obtains the user's motion detected by the motion detecting unit. The motion feature quantities extraction unit extracts the user's motion feature quantities from the obtained motion. The transform unit transforms the motion feature quantities by using a template obtained from the template storage unit. The motion feature quantities of the operational object are obtained from each of the temporal motion sequences of the operational object in the operational object motion storage unit. The operational object motion obtaining unit obtains one of the temporal motion sequences from the storage unit having the feature quantities close to the user's motion feature quantities.

19 Claims, 12 Drawing Sheets

```xml
1  <?xml version="1.0" encoding="UTF-8" ?>
2  <Skeleton>
3  <Root name = "Avatar" offset = "0.000000 0.000000 0.000000"/>
4  <Joint name="vl5" offset=" 0.0000  2.7700  2.3300"/>
5    <Joint name="vl1" offset=" 0.0000  6.5100  0.7300"/>
6      <Joint name="vt10" offset=" 0.0000  7.1100 -1.3100"/>
7        <Joint name="vt6" offset=" 0.0000 17.3700 -2.0200"/>
8          <Joint name="vt1" offset=" 0.0000 15.2900  5.1100"/>
9            <Joint name="skullbase" offset=" 0.0000  7.5100  0.0000"/>
10              <End name="skull_tip" offset=" 0.0000 17.5290  3.5690"/>
11              <End name="jaw_tip" offset=" 0.0000 -4.5450 14.3680"/>
12            </Joint>
13            <Joint name="l_acromioclavicular" offset=" 3.0200  8.2600 12.1300">
14              <Joint name="l_shoulder" offset=" 14.3900  0.0000 -4.0600">
15                <Joint name="l_elbow" offset=" 0.0000 -28.3700  0.0000">
16                  <Joint name="l_wrist" offset=" 0.0000 -23.4400  0.0000">
17                    <End name="l_wrist_tip" offset=" 0.0000 -21.5240  0.0000"/>
18                  </Joint>
19                </Joint>
20              </Joint>
21            </Joint>
22          </Joint>
23        </Joint>
24      </Joint>
25    </Joint>
26  </Joint>
27  </Root>
28  </Skeleton>
```

FIG. 2

```xml
1   <?xml version="1.0" encoding="UTF-8" ?>
2   <Motion>
3       <Source type="BVH" frames="2"/>
4       <Skeleton name="xmlMotion_skeleton.xm
5       <Root name="Avatar">
6           <Position>
7               <X data="0 0"/>
8               <Y data="0 0"/>
9               <Z data="0 0"/>
10          </Position>
11          <Rotation>
12              <Euler>
13                  <Z data="0 0"/>
14                  <X data="0 0"/>
15                  <Y data="0 0"/>
16              </Euler>
17          </Rotation>
18      </Root>
19      <Joint name="vl5">
20          <Euler>
21              <Z data="0 0"/>
22              <X data="0 0"/>
23              <Y data="0 0"/>
24          </Euler>
25      </Joint>
26  </Motion>
```

FIG. 4

```xml
<?xml version="1.0" encoding="UTF-8" ?>

<Feature>
  <Source frames="2" />
  <Motion name="xxx.xml" />
  <Joint name="l_wrist">
    <Spectrum>
      <X data1="0 0" data2="0 0"/>
      <Y data1="0 0" data2="0 0"/>
      <Z data1="0 0" data2="0 0"/>
    </Spectrum>
    <Position>
      <X data="0 0"/>
      <Y data="0 0"/>
      <Z data="0 0"/>
    </Position>
  </Joint>
</Feature>
```

FIG. 6

```
1   <part id="P1">
2     <measure number="1" width="340" type="verse">
3       <print page-number="2">
4         <system-layout>
5           <system-margins>
6             <left-margin>120</left-margin>
7             <right-margin>0</right-margin>
8           </system-margins>
9           <top-system-distance>230</top-system-dis
10        </system-layout>
11      </print>
12      <attributes>
13        <divisions>2</divisions>
14        <key>
15          <fifths>3</fifths>
16          <mode>major</mode>
17        </key>
18        <time symbol="cut">
19          <beats>2</beats>
20          <beat-type>2</beat-type>
21        </time>
22        <clef>
23          <sign>G</sign>
24          <line>2</line>
25        </clef>
26      </attributes>
```

FIG. 9

```
1   <?xml version="1.0" encoding="UTF-8" ?>
2   <Feature>
3   <Source frames="32" />
4   <Rule>
5     <creator type="composer">Johannes Brahms</cre
6     <measure type="verse" />
7   </Rule>
8   <Joint name="l_wrist">
9     <Template>
10      <X data="1.13  0.91  0.70 ..."/>
11      <Y data="3.90  4.20  4.42 ..."/>
12      <Z data="18.67 18.70 19.97 ..."/>
13    </Template>
14  </Joint>
15  </Feature>
```

FIG. 10

OPERATIONAL OBJECT CONTROLLING DEVICE, SYSTEM, METHOD AND PROGRAM

CROSS-REFERENCE TO RELATED APPLICATION

This application claims priority under 35 U.S.C. §119 from Japanese Patent Application No. 2008-113241 filed on Apr. 23, 2008, the entire contents of which are incorporated herein by reference.

BACKGROUND OF THE INVENTION

1. Field of the Invention

The present invention relates to a device, system, method, and program for selecting a motion of an operational object suitable to a condition according to a motion of a person. More particularly, the present invention relates to a device, system, method, and program to enable an avatar to dance in a virtual world according to a choreographed data.

2. Description of Related Art

People can express themselves or communicate with other people through operational objects such as robots and avatars in a virtual world. For example, a person can cause an avatar, which is his or her own operational object, also called a character representing the person, in a virtual world, to dance according to a choreography by operating the avatar in order to express himself or herself or communicate with other people. Moreover, a person can feel as if he or she actually danced, by causing his or her avatar to dance according to a choreography. There are several conventional techniques for causing an operational object to dance according to a choreography. The following presents some examples of such conventional techniques.

Japanese Patent Application Publication No. 2001-276291 discloses a dance game system with which a player can play a dance game by using choreography data previously created by the player. This dance game system composes a choreography based on dance steps that the player performs to music on a foot stepper provided to the dance game system, and then registers the choreography in the dance game system. In addition to choreographies prestored in the dance game system, choreographies thus registered in the dance game system can be used for dance games.

Japanese Patent Application Publication No. 2002-042168 discloses a dancing image exaggerating and synthesizing apparatus for causing a virtual dancer of a three-dimensional computer graphics (3DCG) to perform a highly-sophisticated dance by exaggerating a dance of a person who dances to music. The dancing image exaggerating and synthesizing apparatus synthesizes a dancing image of an actual person and dance patterns read from previously-prepared dance patterns. The dancing image is obtained by composing an image of the person dancing to accompanying music with a camera, and the read dance patters are those keeping pace with the tempo of the accompanying music. In this way, the dancing image exaggerating and synthesizing apparatus generates an image in which a 3DCG virtual dancer is performing the dance.

Japanese Patent Application Publication No. 2005-297095 discloses a robot apparatus that imitates observed motions of a user and also performs new motions obtained by modulating the motions of the user. The robot apparatus captures an image of motions of a user from a camera, and performs the motions. In addition, the robot apparatus accumulates the captured motions of the user in a storage unit inside the robot apparatus, and creates and performs new motions based on the accumulated motions of the user.

The system according to Patent Document 1 provides a variation in the motions of an avatar, which is an operational object, by changing a combination of steps. However, different motions cannot be selected and assigned to steps on each position which limits the variation of selectable motions. In addition, since motions of a user are not directly reflected in motions of an operational object, the user cannot feel a union with the operational object. On the other hand, the techniques described in Patent Documents 2 and 3 are capable of reflecting motions of a user directly in motions of an operational object, but have a drawback in that some undesired motions are also directly reflected against the wishes of the user. Moreover, easy and simple implementation of these techniques is impeded by the inconvenience of a user having to install multiple cameras and dedicated devices.

SUMMARY OF THE INVENTION

In consideration of the foregoing problems, the present invention aims to provide an operational object controlling device and method that is capable of easily reflecting a user's motions in motions of an operational object after modifying the user's motions, thereby allowing the user to feel united with the operational object, and causing the operational object to perform various motions.

Accordingly, in one aspect, the invention provides an operational object controlling device that detects a motion of at least one part of the body of a user and selects a motion for an operational object according to the detected motion. The device includes: a motion detecting unit for detecting the user's motions; a motion obtaining unit for obtaining the user's motion from the motions detected by the motion detecting unit at a plurality of predetermined intervals; a motion feature quantities extraction unit for extracting the user's motion feature quantities each of which is defined by one of the frequency components obtained by applying a Fourier transformation on a temporal sequence of the user's motions obtained by the motion obtaining unit; a template storage unit for storing the templates which weight the frequency components of the user's motion feature quantities; an operational object motion storage unit for storing the temporal motion sequences of the operational object; a motion feature quantities transform unit for transforming the user's motion feature quantities, by use of a template that is obtained from the template storage unit according to environmental information of the user or the operational object; and an operational object motion obtaining unit for selecting one of the temporal motion sequences of the operational object in the operational object motion storage unit that has motion feature quantities close to the user's motion feature quantities transformed by the motion feature quantities transform unit.

In another aspect, the invention provides an operational object selecting method of detecting a motion of at least one part of the body of a user and of selecting a motion of an operational object according to the detected motion. The method includes the steps of: obtaining a motion of the user for each of a plurality of predetermined intervals; extracting the user's motion feature quantities each of which is defined by one of the frequency components obtained by performing a frequency transform on the temporal motion sequences of the user; obtaining a template of a plurality of templates based on environmental information of the user or the operational object, wherein the templates having been previously stored weight the frequency components of the user's motion feature quantities; transforming the user's motion feature quantities by use of the template; and obtaining temporal motion sequences of the operational object that has motion feature quantities close to the user's motion feature quantities thus transformed, the motion feature quantities of the operational object being based on each of the temporal motion sequences of the operational object previously stored.

In yet another aspect, the present invention provides a computer readable article of manufacture tangibly embodying computer readable instructions for executing a computer implemented method for causing a computer to detect a motion of at least one part of the body of a user and for selecting a motion of an operational object according to the detected motion, the method including the steps described above.

BRIEF DESCRIPTION OF THE DRAWINGS

For a more complete understanding of the embodiments of the present invention and their advantages, reference is now made to the following description taken in conjunction with the accompanying drawings.

FIG. 2 shows one example of an XML file of skeleton data in a Biovision Hierarchical Data (BVH), format.

FIG. 4 shows one example of an XML file of motion data in the BVH format.

FIG. 6 shows one example of an XML file of absolute coordinates and feature quantities of motion data in the BVH format.

FIG. 9 shows a part of MusicXML of a score.

FIG. 10 shows one example of an XML file of a template application rule and template information stored in a template database (DB).

DETAILED DESCRIPTION OF THE PREFERRED EMBODIMENTS

Figure 1:
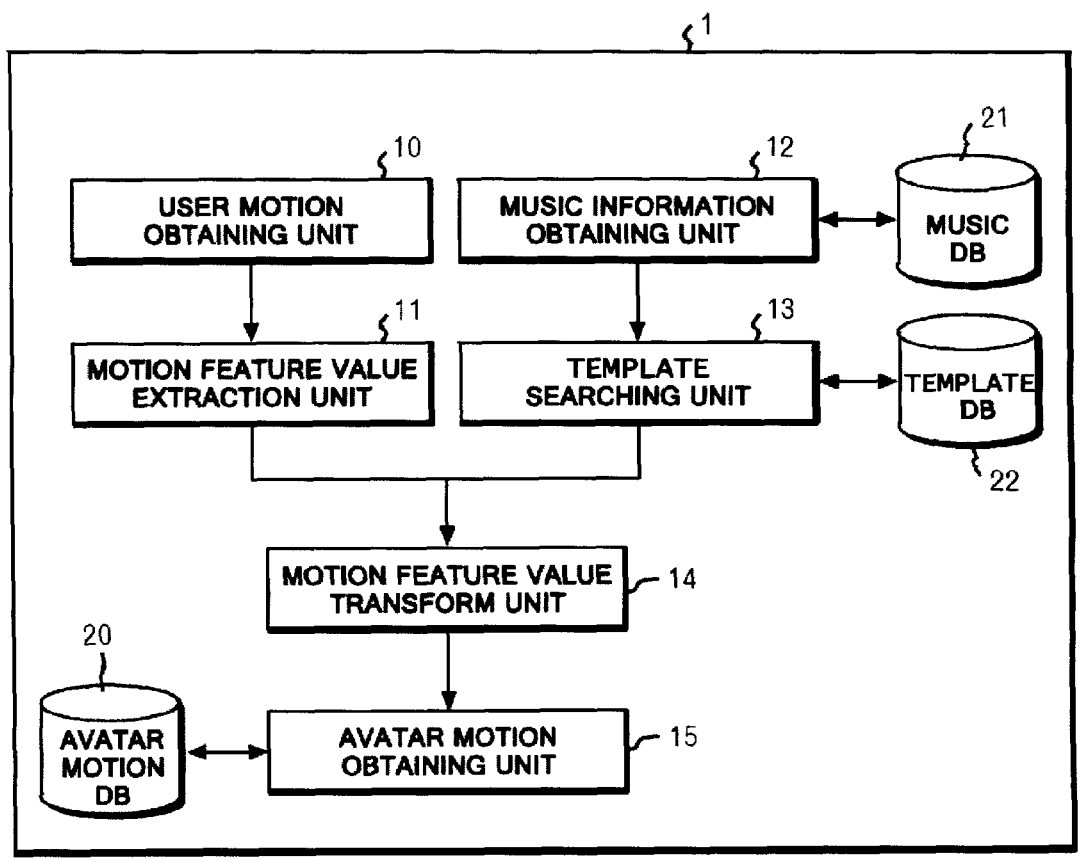
FIG. 1 shows a functional configuration of an operational object controlling device according to an embodiment of the invention.

A preferred embodiment of the present invention provides an operational object controlling device that detects a motion of at least one part of the body of a user and selects a motion for an operational object according to the detected motion. The operational object controlling device includes a motion detection unit for detecting a motion of the user, a motion obtaining unit, a motion feature quantities extraction unit, a template, e.g., filter, storage unit, an operational object motion storage unit, a motion feature quantities transform unit and an operational object motion obtaining unit. The motion obtaining unit obtains the user's motion, which is detected by the motion detecting unit, for each predetermined interval. The motion feature quantities extraction unit extracts the user's motion feature quantities each of which is defined by one of the frequency components obtained by applying a Fourier transformation on a temporal sequence of the user's motions obtained by the motion obtaining unit.

The template storage unit stores templates which weight the frequency components of the user's motion feature quantities. The operational object motion storage unit previously stores temporal motion sequences of the operational object. The motion feature quantities transform unit transforms the user's motion feature quantities, by use of a template that is obtained from the template storage unit according to environmental information of the user or the operational object. The operational object motion obtaining unit obtains a temporal motion sequence of the operational object that has motion feature quantities close to the user's motion feature quantities thus transformed, the motion feature quantities of the operational object being figured out based on each of the temporal motion sequences of the operational object previously stored in the operational object storage unit.

The "operational object" here is an object operated by a user to perform motions. Typical examples of this are an avatar in a virtual world, and a robot in a real space. Also, the operational objects include human types as well as animal types and others. The "frequency transform" means to examine various frequency components included in temporal sequence values (temporal motion sequence value in the present invention), and the examples of the transform are the Fourier transformation and the Wavelet transform. The "environmental information" is composed of information on the user or the operational object and information on an environment where the user or the operational object exists, such as the information of a played musical piece, time, the sex and age of an avatar.

According to another preferred embodiment of the invention, the frequency components in the user's motion feature quantities are weighted according to the environmental information, by which the user's motion is modified and then is reflected in the motion of the operational object. "Modification" means to amplify or soften a particular motion of the user, such as making the particular motion larger or smaller.

In addition, in an embodiment of the invention, the operational object motion obtaining unit calculates a correlation coefficient between a temporal sequence dataset of each motion stored in the operational object motion storage unit, and temporal motion sequences obtained by performing an inverse frequency transform on the user's motion feature quantities with weight assigned to them by the motion feature quantities transform unit. Then, the operational object motion obtaining unit obtains the temporal motion sequences having the correlation coefficient closest to 1.0, e.g., unity, from among the temporal motion sequences stored in the operational object motion storage unit. By obtaining the temporal motion sequences of the operational object having the correlation coefficient closest to unity with the temporal motion sequences calculated from the weighted user's motion feature quantities, the operational object motion obtaining unit can identify the motion of the operational object close to the user's motion. Moreover, the motion feature quantities transform unit in an embodiment of the invention can use the template after performing the frequency transform on the template. Use of such template already processed by the frequency transform reduces the influence of frequency shift on the calculation result.

Each of the motions of the operational object in an embodiment of the invention can be represented in a tree structure having at least one motion point. Here, the motion point is, for example, a joint in the case where the operational object is an avatar, a robot or the like having a body structure similar to a human. Use of the tree structure including at least one motion point to represent the motion enables the expressing of a relationship between motion points and also the preparing of a flexible data structure with a high degree of scalability.

Additionally, the operational object motion storage unit and the template storage unit in an embodiment of the invention are relational databases or databases in the Extensible Markup Language (XML). Thus, the motion of the operational object can be stored as it is in the form of the tree structure.

In yet another preferred embodiment of the invention, the environmental information of the user or the operational object is information on a musical piece played while the user performs motions, and the operational object controlling device further includes a music information storage unit for storing the information on the music. The information on the musical piece indicates, for example, a part of the musical piece such as "solo" and "chorus." One of the templates is obtained according to the information on the musical piece, and thereby a user's motion can be modified to suit the musical piece to cause the operational object to perform the modified motion. For example, for the part of "chorus" that is an exciting part of the music, a template weighting high frequency components can be selected to make the motion more active.

Furthermore, in an embodiment of the invention, each of the predetermined intervals is determined as equivalent to one segment of a single measure of a musical piece. The segment is obtained by dividing the single measure by one or more. This allows each segment of a musical piece and its corresponding segment of the entire motions to coincide with each other, thereby preventing the operational object from performing motions out of the rhythms of music.

Below, a description will be provided, with reference to the figures, for a case of selecting motions for an avatar according to motions of a user dancing to music, as a preferred embodiment of carrying out the present invention. Here, an avatar is an operational object of a user in a virtual world. This description merely provides one example of the present invention. The technical scope of the present invention is not limited to this embodiment. In addition, the description of the embodiment of the present invention provides only some of the most preferable results of implementation of the present invention. Thus, the results of implementation of the present invention are not limited to those described in the embodiment or example of the present invention.

Functional Configuration of Operational Object Controlling Device

Referring to FIG. 1, a functional configuration of an operational object controlling device 1 according to an embodiment of the present invention is shown. The operational object controlling device 1 includes a user motion obtaining unit 10, a motion feature value, e.g., quantities, extraction unit 11, a music information obtaining unit 12, a template searching unit 13, a motion feature value, e.g., quantities, transform unit 14, an avatar motion obtaining unit 15, an avatar motion database (DB) 20, a music DB 21 and an a template DB 22. Although this embodiment is presented as the operational object controlling device 1, the embodiment of the present invention can employ a system configuration in which functional units of the operation object controlling device 1 are installed in a distributed manner and connected to a network.

The user motion obtaining unit 10 obtains a user's motions as three-dimensional absolute positions in temporal sequences through an input device (motion detector) such as a Wii Remote (trademark). To this end, any device capable of obtaining three-dimensional absolute positions in temporal sequences can be used as the input device. One example of such devices is a device capable of calculating an absolute position through computation with an acceleration sensor. The motion feature quantities extraction unit 11 extracts the feature quantities of a user's motions by performing a frequency transform on temporal motion sequences obtained by the user motion obtaining unit 10. In this embodiment, the Fourier transformation is used for the frequency transform.

The music information obtaining unit 12 obtains information on a musical piece currently played and information on the next measure of the musical piece, from the music DB 21. The template searching unit 13 obtains template information from the template DB 22 according to the information obtained by the music information obtaining unit 12. The motion feature quantities transform unit 14 weights frequency components of the motion feature quantities according to both the motion feature quantities extracted by the motion feature quantities extraction unit 11, and the template information obtained by the template searching unit 13. The avatar motion obtaining unit 15 calculates correlation coefficient between temporal motion sequences obtained through the inverse Fourier transformation of the motion feature quantities weighted by the motion feature quantities transform unit 14, and each of temporal motion sequences in the avatar motion DB 20, and obtains the temporal motion sequences having a correlation coefficient closest to unity, e.g. 1.0, in the avatar motion DB 20. The avatar is displayed on a display or the like while performing a motion based on the obtained temporal motion sequences.

The avatar motion DB 20 stores a temporal sequence of a continuous motion and its motion feature quantities for a specific number of frames, and accumulates multiple sets of the temporal motion sequences and feature quantities with respect to multiple types of motions of each part of the entire body of the avatar. The frame is a unit of sampling of the continuous motion. For example, one measure of a musical piece is divided into K segments and the motion is sampled at intervals of a 1/K measure for every frame. Thus, the number of frames is equivalent to one measure. Thus, each of the predetermined intervals at which the user's motion is obtained is equivalent to one segment of a single measure where the single measure is divided by an integer equal to at least one. As the number K increases, the avatar is allowed to perform more smooth motions, but a larger volume of data is needed. Note that, a value of K is determined based on the performance and the like of the operational object controlling device 1. The avatar motion DB 20 can be a relational DB in which information is expressed in a table format, or can be an XML DB in which information is expressed in XML. In this embodiment, the avatar motion DB 20 is an XML DB.

The music DB 21 accumulatively stores music information on composers of respective musical pieces, and attribute information indicating an attribute such as "verse" for each measure of each of musical pieces, or a played time until the measure. The template DB 22 accumulatively stores template information on templates and rules for applying templates to the motion feature quantities. Here, the template information is used to emphasize specific frequencies in the motion feature quantities. The music DB 21 can also be either a relational DB or an XML DB. In this embodiment, the music DB 21 is an XML DB.

The user motion obtaining unit 10 is one example of a motion obtaining unit; the template searching unit 13 and the motion feature quantities transform unit 14 are one example of a motion feature quantities transform unit; the avatar motion obtaining unit 15 is one example of an operational object motion obtaining unit; the music DB 21 is one example of a music information storage unit; and the avatar motion DB 20 is one example of an operational object motion storage unit. Also, each of the DBs can be a database on a hard disk, or can be prepared in an external storage device such as a memory. A hardware configuration of the operational object controlling device 1 will be described later.

Avatar Motion Database

Here, a detailed description for the avatar motion DB 20 will be provided. In this description, an avatar's motions are expressed in a Biovision Hierarchical Data, (BVH), file format that is one general motion data format and the avatar motion DB 20 is the XML DB conforming to the BVH format. Also, the avatar's motion can be expressed in another format such as Acclaim Skeleton File and Acclaim Motion Capture (ASF/AMC) format.

A relational DB can be used as the avatar motion DB 20. The avatar motion DB 20 is composed of three items: skeleton data defining the skeleton structure and dimensions of an avatar; frame-based motion data defining an avatar's motion; and absolute coordinates and feature quantities of the motion data. The Skeleton data and the frame-based motion data are data pieces constituting a motion data set. In the format of motion data such as the BVH format, a human body is expressed as an articulated link structure having multiple joints and bones. The motion data includes information on the length of each bone as well as time-series information on the position of each joint or time-series information on the angle of each joint. The avatar can be moved by use of the motion data. On the other hand, the absolute coordinates and feature quantities of the motion data are used to select a motion for the avatar, which will be described later.

Figure 3:
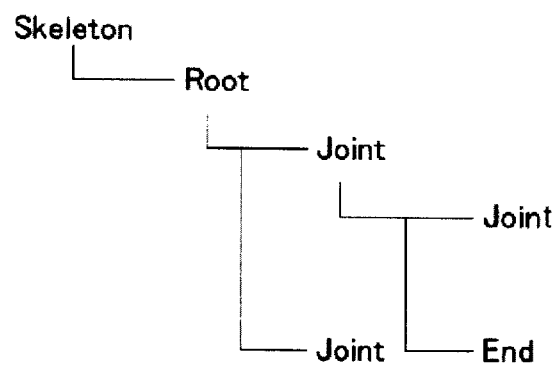
FIG. 3 shows an XML file tag structure of skeleton data in the BVH format.

First the skeleton data, defining the skeleton structure and dimensions of an avatar will be described. In the skeleton, a skeleton structure and dimensions, i.e., parent-and-child connection relationships among joints and the length of each bone are defined. FIG. 2 shows one example of an XML file of skeleton data in the BVH format, and FIG. 3 shows an XML file tag structure of skeleton data in the BVH format. As shown in FIG. 3, in the skeleton data, the skeleton structure and dimensions of an avatar are defined with <Root>, <Joint> and <End> under <Skeleton>. (The skeleton tags in FIGS. 3, 5, 7, and 11 are depicted in the figures without brackets.)

<Joint> denotes a joint node constituting a hierarchy structure, and has at least one <Joint> or <End> as a child node. <Root> denotes a special <Joint> serving as the sole starting point of the hierarchy structure, and has at least one <Joint> as a child node. <Root> defines the highest part of the hierarchy structure. If an object represents a person, a part representing the waist is generally defined as <Root>. <End> denotes a special <Joint> that is an end node of the hierarchy structure, and does not have any child node.

<Root>, <Joint> and <End> each have a name attribute and an offset attribute. The name attribute specifies the name of a joint, and the offset attribute specifies the positions of x, y and z, in listed order, from the parent joint of <Root>. In <Root> in FIG. 2, "Avatar" is set in name and the initial positions in the world coordinate system are set in offset. In addition, in <Joint> on line 4 in FIG. 2, a joint name "v15" is defined in name, and the positions of x, y and z from <Root> are defined as (0.0000, 2.7700, 2.3300) in offset. On line 5 and on following lines in FIG. 2, joints are defined in the same way in <Joint>. Here, the joints of <Joint> are defined in ascending order of the distance from <Root>. Moreover, in <End> on line 10 in FIG. 2, a joint name is defined as "skull_tip" and the positions from the Root are defined as (0.0000, 17.5290, 3.5690), in the same manner as <Joint>. As described above, there is no definition of <Joint> below <End>.

It is preferable to use the same skeleton data in all the motion data accumulated in the avatar motion DB 20, from the viewpoint of the data volume and the like. For this reason, when new motion data of an avatar is registered, and if the skeleton of the avatar performing the motion to be registered is different from the skeleton used in the avatar motion DB 20, a scale factor of each joint in the skeleton of the avatar performing the motion to be registered is obtained with respect to the skeleton in the avatar motion DB 20. Then, according to the obtained scale factors, the new avatar's motion data is scaled up or down to follow the skeleton in the avatar motion DB 20. Then, the adjusted avatar's motion data is registered in the avatar motion DB 20.

When the skeleton data of an avatar operated by a user is different from the skeleton data in the avatar motion DB 20, the scale factor between the skeleton of the user's avatar and the skeleton in the avatar motion DB 20 is first obtained for each Joint in the same manner as in the above case of registering the motion data. Then, the motion data normalized to follow the skeleton in the avatar motion DB 20 are scaled up or down according to the obtained scale factors, and thus are adjusted to the avatar operated by the user. A conventional technique such as Dynamic Time Warping is used as this scaling technique. By use of this technique in combination of the avatar motion DB 20 in which motions based on a single standard skeleton are registered, it is possible to cause various avatars having different skeletons to perform motions.

Figure 5:
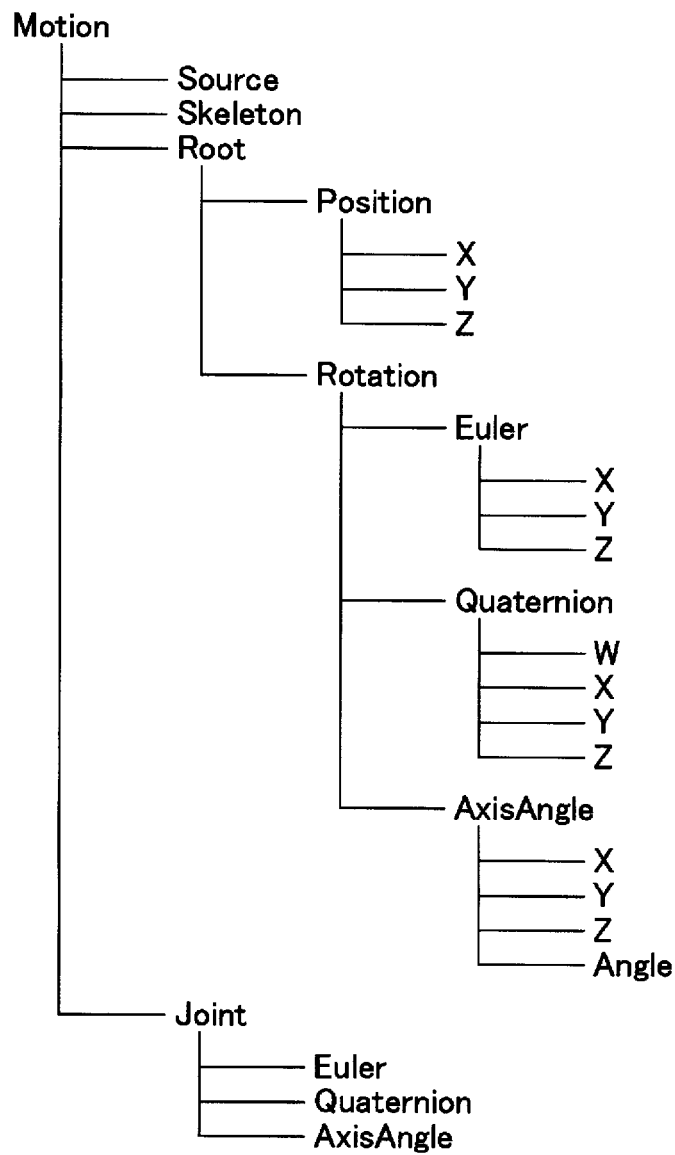
FIG. 5 shows an XML file tag structure of motion data in the BVH format.

Second, the frame-based motion data defining an avatar's motion will be described. In the motion data, the positions of <Root> and the rotations of <Joint> and <Root> are defined frame by frame. FIG. 4 shows one example of an XML file of motion data in the BVH format, and FIG. 5 shows an XML file tag structure of motion data in the BVH format. As shown in FIG. 5, in the motion data, the postures of all joints of an avatar are defined with <Source>, <Skeleton>, <Root> and <Joint> frame by frame.

<Source> specifies a source file format in a type attribute and the length of total data in a frame attribute. On line 3 in FIG. 4, type="BVH" and frame=2 are defined in <Source>. type="BVH" specifies that the format of a source file is the BVH format, and frame=2 specifies that the motion data of 2 frames is stored. <Skeleton> is a skeleton information defining tag for specifying a corresponding file of skeleton data in a name attribute. On the fourth line in FIG. 4, name=xmlMotion_skeleton.xml is defined in <Skeleton>. This indicates that xmlMotion_skeleton.xml is the name of a skeleton file corresponding to the motion data shown in FIG. 4, that is, a skeleton file including the definition of the skeleton structure of an avatar operable by using the motion data shown in FIG. 4.

In <Root>, the position information and rotation information of <Root> are defined. In <Joint>, the rotation information of each joint is stored in temporal sequences in a line direction. Here, the joint information needs to conform to the skeleton data specified in <Skeleton>. This is because the joint information is motion data corresponding to the skeleton data specified in <Skeleton>. Any of the Euler angle representation, the Quaternion representation and the axis angle representation can be used as a method of representing the rotation information. In any of the representation methods, numerical values need to be given in the order of frames.

As shown in FIG. 5, under <Root>, <Position> and <Rotation> are defined. <Position> is a Root position defining tag for defining <X>, <Y> and <Z>. In data attributes of <X>, <Y> and <Z> tags, positions in the three-dimensional coordinate system are specified in the order of frames. <Rotation> is a Root pointing direction defining tag for defining any one of <Euler>, <Quaternion>, and <AxisAngle> tags. In any kind of such tags, the pointing direction in the three-dimensional coordinate system is specified as rotation from a reference direction in the order of frames. Here, the reference direction is defined in a way that the front direction is the +z direction, and that the gravity direction is the +y direction.

<Euler> is an Euler representation defining tag including <X>, <Y> and <Z> for specifying Euler angles in a data attribute in the order of frames. In this case, the rotation matrices of <X>, <Y> and <Z> are multiplied in the order of specifying <X>, <Y> and <Z>. <Quaternion> is a Quaternion representation defining tag including <W>, <X>, <Y> and <Z> for specifying quaternions in data attributes in the order of frames. <AxisAngle> is an axis angle representation defining tag including <X>, <Y>, <V> and <Angle> for specifying three-dimensional vectors each representing a direction of a rotation axis, and rotation angles in data attributes in the order of frames.

In the motion data shown in FIG. 4, the pointing directions of the Root are defined with <Euler> in which the data attributes of <X>, <Y> and <Z> tags each indicate (0.0). This means that the Root points in the reference direction.

Meanwhile, <Joint> is a Joint rotation defining tag for defining any one of <Euler>, <Quaternion>, and <AxisAngle> tags. Tags included in any of the <Euler>, <Quaternion> and <AxisAngle> under <Joint> are similar to those under <Root>. The pointing directions of each joint in the three-dimensional coordinate system are specified, as a rotational movement from a reference direction, in the data attributes of <X>, <Y> and <Z> in the order of frames. As the reference direction, different directions are determined for respective joint parts. In general, the reference directions of the respective joints are determined based on the posture in which the avatar stands up with the arms hanging down.

Figure 7:
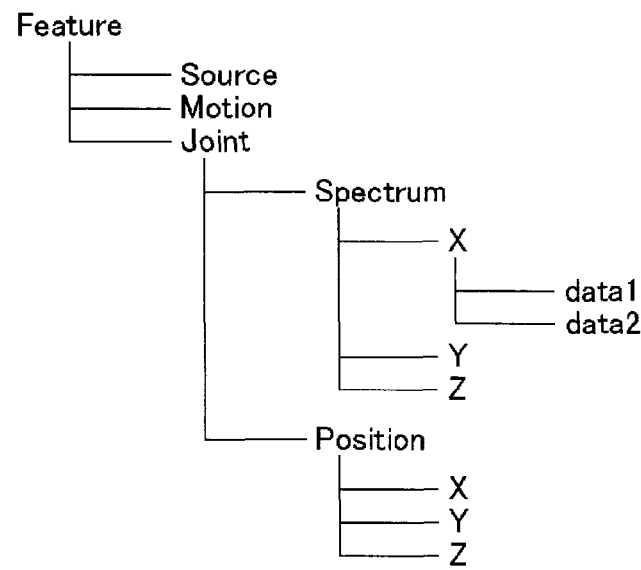
FIG. 7 shows an XML file tag structure of absolute coordinates and feature quantities of motion data in the BVH format.

Last, the absolute coordinates and feature quantities of the motion data will be described. FIG. 6 shows one example of an XML file of absolute coordinates and feature quantities of motion data in the BVH format, and FIG. 7 shows an XML file tag structure of absolute coordinates and feature quantities of motion data in the BVH format. As shown in FIG. 7, the absolute coordinates and motion feature quantities of motion data are defined with <Source>, <Motion> and <Joint> under <Feature>.

<Source> is a Source information defining tag for specifying the number of dimensions of each motion feature quantities in a frame attribute. This number of dimensions is equal to the number of frames in its corresponding motion data in the case where the absolute coordinates are used. The corresponding motion data is defined in <Motion>. Assuming that the absolute coordinates and motion feature quantities in the motion data shown in FIG. 6 correspond to the motion data shown in FIG. 4, the number of dimensions specified in the frame attribute in FIG. 6 is 2. This is the same as the number of frames in the motion data in FIG. 4. <Motion> is a motion data defining tag for indicating a file name of its corresponding motion data in a name attribute.

<Joint> is a node defining tag for specifying a joint name in a name attribute. This joint name needs to conform to the joint name in the corresponding motion data. As shown in FIG. 7, <Spectrum> and <Position> are defined under <Joint>. <Spectrum> is a motion feature quantities defining tag for specifying the name of motion feature quantities in a type attribute and motion feature quantities in each of <X>, <Y> and <Z>. Since the motion feature quantities takes a complex number as a result of the Fourier transformation, a data 1 attribute indicates a real part whereas a data 2 attribute indicates an imaginary part. <Position> is an absolute coordinate defining tag for specifying a motion feature quantities name in a type attribute and the absolute coordinates in each of <X>, <Y> and <Z>.

The absolute coordinates and feature quantities of the motion data can be figured out from the skeleton data defining the skeleton structure and dimensions of an avatar; and the frame-based motion data defining an avatar's motion. For this reason, the absolute coordinates and feature quantities of the motion data can be obtained, when needed, from the skeleton data defining the skeleton structure and dimensions of an avatar and the frame-based motion data defining an avatar's motion. However, this calculation takes some time. For this reason, it is desirable to calculate the absolute coordinates and feature quantities in advance and to store them in the avatar motion DB 20.

Calculation of Absolute Coordinates

Here, a description is provided for how to calculate the absolute coordinates. As in the foregoing BVH format, the avatar's motion is generally expressed not by absolute coordinates but by relationships among joints. On the other hand, the information obtained by the input device is expressed by absolute coordinates, and the user's motion feature quantities is a value calculated based on the absolute coordinates. Accordingly, in order to compare the user's and avatar's motion feature quantities with each other, it is necessary to obtain the avatar's motion feature quantities based on the absolute coordinates as will be described later. For this purpose, the absolute coordinates of the avatar's motions are obtained at the start of the process.

An avatar's motion is transformed into absolute coordinates on the basis of Equation 1 using: v=(x, y, z, 1) with X, Y, Z offset values (x, y, z) of each joint from its parent joint in a specific frame in skeleton data; Euler angle values ($\theta_x$, $\theta_y$, $\theta_z$) in the same frame in motion data; transform matrices representing respective rotations of x, y, z axes; and a parent joint vector ($t_x$, $t_y$, $t_z$). Here, the transform matrices used in Equation 1 are presented in Equations 2, 3 and 4 and a determinant of the parent joint vector ($t_x$, $t_y$, $t_z$) is presented in Equation 5.

$$v' = vR_z(\theta_z)R_y(\theta_y)R_x(\theta_x)T(t_x, t_y, t_z) \quad \text{Equation 1}$$

$$Rx(\theta) = \begin{bmatrix} 1 & 0 & 0 & 0 \\ 0 & \cos(\theta) & \sin(\theta) & 0 \\ 0 & -\sin(\theta) & \cos(\theta) & 0 \\ 0 & 0 & 0 & 1 \end{bmatrix} \quad \text{Equations 2, 3, and 4}$$

$$Ry(\theta) = \begin{bmatrix} \cos(\theta) & 0 & -\sin(\theta) & 0 \\ 0 & 1 & 0 & 0 \\ \sin(\theta) & 0 & \cos(\theta) & 0 \\ 0 & 0 & 0 & 1 \end{bmatrix}$$

$$Rz(\theta) = \begin{bmatrix} \cos(\theta) & \sin(\theta) & 0 & 0 \\ -\sin(\theta) & \cos(\theta) & 0 & 0 \\ 0 & 0 & 1 & 0 \\ 0 & 0 & 0 & 1 \end{bmatrix}$$

$$T(t_x, t_y, t_z) = \begin{bmatrix} 1 & 0 & 0 & 0 \\ 0 & 1 & 0 & 0 \\ 0 & 0 & 1 & 0 \\ t_x & t_y & t_z & 1 \end{bmatrix} \quad \text{Equation 5}$$

Specifically, the absolute coordinates of a specific joint are obtained in the steps of:

(1) substituting the offset values of Root into $(t_x, t_y, t_z)$;

(2) calculating Equation 1 by substituting the offset values of a child joint into (x, y, z) and the Euler angle values in the motion data into $(\theta_x, \theta_y, \theta_z)$; and (3) substituting (x', y', z') of obtained v'=(x', y', z', 1) into $(t_x, t_y, t_z)$. The steps (2) and (3) are repeated until the absolute coordinates of a desired joint are obtained.

For example, consider a case where absolute coordinates are calculated for the left hand "l_wrist" shown on line 17 in the skeleton data in FIG. 2. In this case, first, the absolute coordinates of the joint of "v15" are calculated in the above steps (1) to (3). Then, the absolute coordinates of the joint of "v11" are calculated in the same manner by use of the calculated absolute coordinates of "v15." The absolute coordinates are sequentially calculated in the same manner for the joints including the Root joint to the joint "l_wrist." In this way, the absolute coordinates of the joint "l_wrist" can be obtained.

Motion Feature Quantities

Next, the motion feature quantities of absolute coordinates of an avatar will be described. The temporal motion sequences of the avatar are expressed in the three-dimensions of x, y, and z. Here, a method for extracting feature quantities is described for each of the dimensions.

Here, assume that $a=(a_0, a_1, \ldots, a_{K-1})$ denotes a specific-dimensional temporal motion sequence, for example, of x coordinates in temporal motion sequences of K frames. Then, $A=(A_0, A_1, \ldots, A_{K-1})$ is obtained through the Fourier transformation shown in Equation 6 of $a=(a_0, a_1, \ldots, a_{K-1})$. Note that K denotes the number of frames obtained by dividing one measure of a musical piece into K segments.

$$A_k = \sum_{n=0}^{K-1} a_n \exp\left(-j\frac{2\pi kn}{K}\right)$$

$$(k = 0, 1, \ldots, K-1) \, j = \sqrt{-1}$$

Equation 6

The discrete Fourier transformation shown is performed on the y and z coordinates of the remaining two dimensions to obtain $B=(B_0, B_1, \ldots, B_{K-1})$ and $C=(C_0, C_1, \ldots, C_{K-1})$. The values A, B and C thus obtained are used as the motion feature quantities. The values $A_k$, $B_k$ and $C_k$ are complex numbers, and the motion feature quantities are of three-dimensional temporal sequence data of the K frames. For this reason, an apparent number of feature quantities per motion is 2×K×3, but their degree of freedom is K×3. In addition, although the calculation cost for the discrete Fourier transformation is $O(K^2)$, this calculation cost can be reduced to $O(K_{log(K)})$ in the case of employing the fast Fourier transformation which is a method at higher speed than the discrete Fourier transformation.

Music Database

Figure 8:
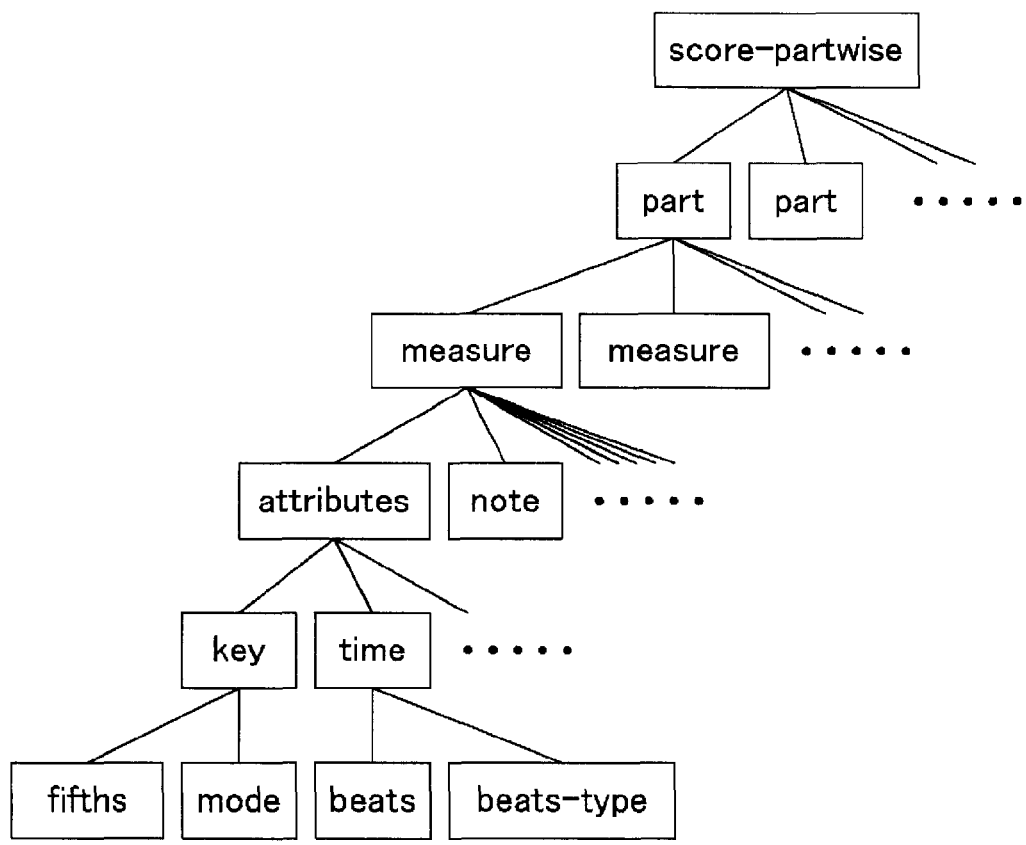
FIG. 8 shows an example of a logical structure of MusicXML.

Next, a case where the music DB 21 is an XML DB is explained as one example. Note that the music DB 21 is not limited to an XML DB but can be a relational DB. The music DB 21 accumulatively stores MusicXML files in which attribute information such as "chorus" and "verse" is added to each measure or each played time. The MusicXML file is composed of three elements of "music information," "play information" and "score information." The music information indicates a title, composer and the like of each musical piece, the play information indicates information on an audio device and the like, and the score information indicates a score image and has notes and lyrics per measure written therein. FIG. 8 shows an example of a logical structure of MusicXML. As shown in FIG. 8, in a specific description of MusicXML, a score, a part and <measure> for specifying a measure are written, and score tags such as <attributes> indicating a key and time and <note> specifying a note are written under <measure>.

FIG. 9 shows a part of MusicXML of a score. A type attribute is added to <measure> specifying a measure as shown in FIG. 9, and the added type attribute indicates that this measure is "verse." A number attribute indicates a sequential number of a measure. In FIG. 9, the number attribute indicates that the measure is the first measure. In addition, an annotation can be added to a musical piece at a particularly-specified time point, by attaching time line information as in Timeline Annotator to the time line of information in XML format used in iTunes (trademark) such as iTunes Music Library.xml.

Template Database

Figure 11:
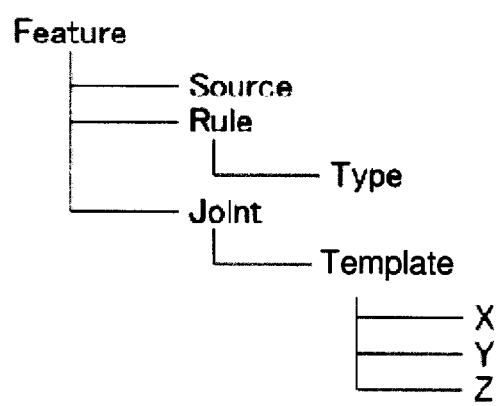
FIG. 11 shows an XML file tag structure of a file application rule and file information.

Next, a case where the template DB 22 is an XML DB is explained as one example. Note that, the template DB 22 is not limited to an XML DB but can be a relational DB. The template DB 22 accumulatively stores XML files of template application rules and template information. FIG. 10 shows one example of an XML file of a template application rule and template information stored in the template DB 22. FIG. 11 shows an XML file tag structure of a file application rule and file information. As shown in FIG. 11, <Source>, <Rule> and <Joint> are defined under <Feature> to specify a template application rule and template information.

<Source> is a Source information defining tag for specifying the number of dimensions of a template in a frame attribute. A template can be applied to motion data only when the number of dimensions of the template is equal to the number of frames defined in the motion data. For this reason, if several types of motion data respectively having different numbers of frames are supposed to be used, it is necessary to prepare the same number of XML files as the number of the types of motion data, for every application rule and template information. Since frames=32 is specified on line 3 in FIG. 10, this template information can be applied to motion data having 32 frames.

<Rule> is a tag for specifying music information targeted for a rule application, and uses type attributes to define tags for a format of music information and an element of the music information. Under <Joint>, a motion feature quantities defining tag <Template> is defined, and the template information for motion feature quantities is defined in a type attribute of each of <X>, <Y> and <Z>. The relationship between <Joint> and <Template> is the same as that between <Joint> and <Spectrum> of the motion feature quantities stored in the avatar motion DB 20.

The XML file shown in FIG. 10 is one example of a template applied to a musical piece composed by Johannes Brahms at a measure defined as "verse." The composer name and the music part "verse" are specified on the 5th and 6th lines. The name attribute of <Joint> on line 8 indicates that the XML file is applied to the joint "l_wrist." Possible template application examples for weighting frequency components of motion feature quantities are: to emphasize low frequency components for a musical part such as "solo" where relatively mild motions are more suitable; and to emphasize both high and low frequency components for a musical part such as "chorus" where exciting and energetic motions are more suitable.

Avatar's Motion Selection Processing

Figure 12:
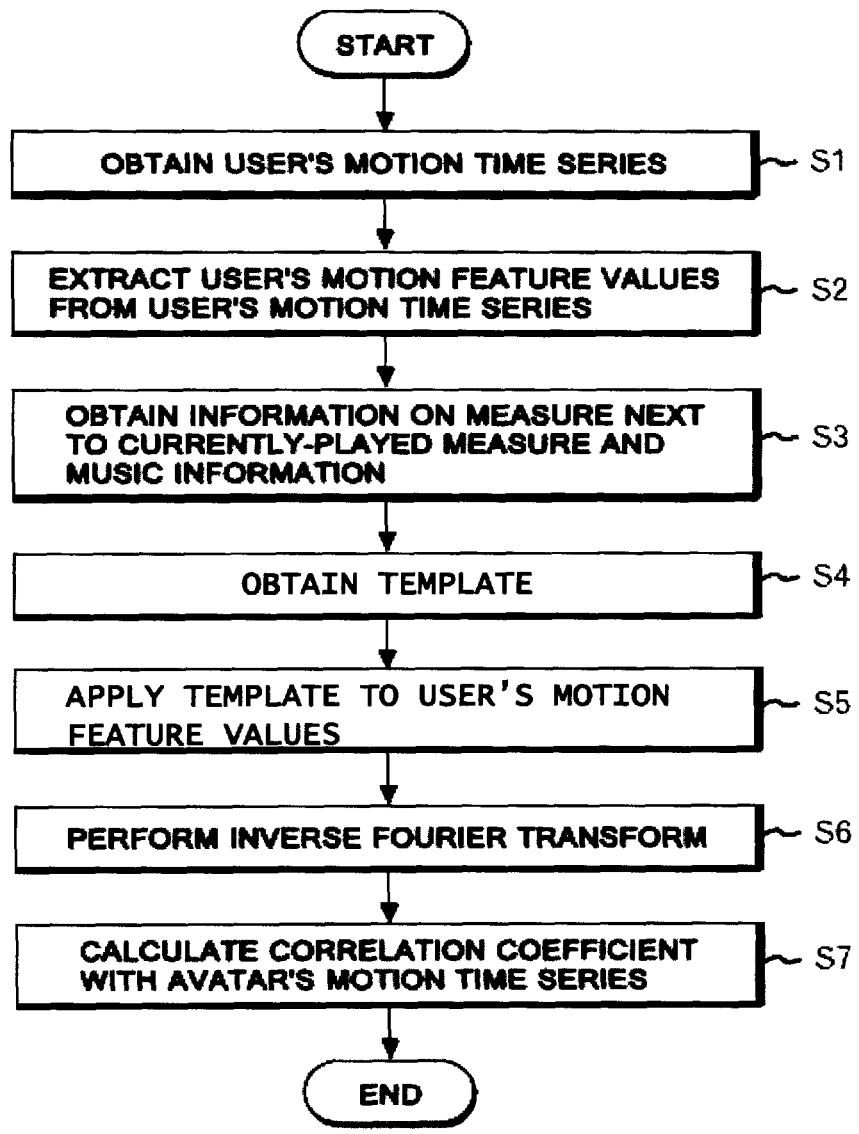
FIG. 12 shows a flowchart of avatar's motion selection processing.

FIG. 12 shows a flowchart of avatar's motion selection processing. The avatar's motion selection processing starts once a musical piece starts. First, in step S1, the user motion obtaining unit 10 obtains temporal motion sequences of a user from an input device. Here, the description is provided, for example, based on the case where a Wii Remote (trademark) is used as the input device. The Wii Remote is equipped with a CMOS image sensor in its front edge, and is used in combination with a horizontally-long bar-like device, called a sensor bar, which has five infrared LEDs incorporated at both ends. When the Wii Remote points to a television screen, the image sensor senses two light spots from both ends of the sensor bar. A pointing direction in which the Wii Remote points to the television screen, and a distance between the Wii Remote and the television screen can be calculated based on the positional relationship and distance between the sensed two light spots. The user motion obtaining unit 10 obtains, as a user's motion, the pointing direction of the Wii Remote and the distance from the Wii Remote, which are thus calculated.

When only one input device is used as in the case where a user holds a device with the right hand, it is not possible to correctly obtain a motion such as a rotation in which the body of the user turns around. For this reason, a motion such as a rotation is obtained using two or more devices by specifying in advance which part of the body is assigned to each of the devices (when two devices are held with the right and left hands. The device on the left hand side remains in left hand, and the device held with the right hand is dedicated to the right hand, etc. If more input devices are respectively assigned to more parts of the body, the motion of each of the parts of the user's body can be reflected in a motion of the corresponding part of the avatar's body. In this case, it is necessary to specify correspondences between devices and parts of a user's body, respectively, before actual use. In addition, temporal motion sequences and motion feature quantities need to be defined for each part of the body in the avatar motion DB 20.

In terms of intervals of sampling motions of a user, the user motion obtaining unit 10 samples the motions not at specific fixed intervals, but at intervals of a 1/K measure (resulting from division of one measure into K segments). This measure dividing number K needs to be equal to the number of dimensions or frames in the avatar motion DB 20 and the template DB 22.

Then, the motion feature quantities extraction unit 11 obtains user's motion feature quantities from the temporal sequence of the user's motions obtained in step S1. The user's motion feature quantities are obtained through the Fourier transformation shown in Equation 6 in the same manner of obtaining the foregoing avatar's motion feature quantities.

In step S3, from the music DB 21, the music information obtaining unit 12 obtains information on the measure next to a currently played measure and its music information.

The music information is obtained by use of a conventional technique. Obtaining the information on the measure next to a currently played measure means to obtain the information indicating that the next measure is a measure of "verse," for example when a measure of "solo" is currently played. Such obtaining is necessary because the avatar performs a motion, which is selected based on a user's motion obtained in step S1 by use of the information obtained in step S3, at a time point sometime after the user's motion is obtained.

On the basis of the information on the measure next to the currently played measure and its music information obtained in step S3, the template searching unit 13 searches the template DB 22 to obtain templates (step S4). Since the template DB 22 is the XML DB as described above, XQuery or the like is used for the search. In the case where two or more search results are obtained, a template is determined in any method, such as selecting a template at random or using the average of the search results to select a template.

The template obtained in step S3 is applied to the user's motion feature quantities obtained in Step S2 (step S5). Here, X, Y and Z denote the user's motion feature quantities for the axes X, Y and Z, respectively, and α, β and γ denote templates for the axes X, Y and Z, respectively. The frequency components in the X axis direction, which are desired to be emphasized, can be emphasized according to Equation 7.

At this time, application of the template obtained in step 4 enables the avatar's motion suited to the music to be obtained by searching. Note that it is desirable to set $α_0$, $β_0$ and $γ_0$ at 0 because these are direct current components. The same calculation is carried out for the other two axes. Consequently, X', Y' and Z' are obtained.

$$X'_k = α_k X_k \, (k=0,1\ldots,K-1) \qquad \text{Equation 7}$$

X', Y' and Z' obtained in step S5 are subjected to the inverse Fourier transformation for the frequency domain (step S6). For example, the inverse Fourier transformation for $x_i' = (x'_0, x'_1, \ldots, x'_{K-1})$ is expressed as Equation 8.

$$x'_k = \frac{1}{K}\sum_{l=0}^{K-1} X_l \exp\left(-j\frac{2\pi kl}{K}\right) \, (k=0,1,\ldots,K-1) \qquad \text{Equation 8}$$

Last, a correlation coefficient is calculated using Equation 9 for a set of x', y' and z' obtained in step S6 and each of all the temporal motion sequences $a_i$, $b_i$ and $c_i$ (l=1, 2, ...) of all the avatar's motions i (l=1, 2, ...) in the avatar motion DB 20. Then, the avatar's motion having the correlation coefficient closest to unity is obtained (step S7). The avatar's motion thus obtained is displayed on the display or the like.

$$\text{Correlation Coefficient} = \frac{x' \cdot a_i + y' \cdot b_i + z' \cdot e_i}{\sqrt{|x'|^2 + |y'|^2 + |z'|^2}\sqrt{|a_i|^2 + |b_i|^2 + |c_i|^2}} \qquad \text{Equation 9}$$

In the flowchart shown in FIG. 12, the avatar's motion selection processing involves: performing the Fourier transformation on the temporal sequence of the user's motions; applying the templates to the resultant temporal sequence of the user's motions; performing the inverse Fourier transformation on the template processed, e.g., filtered, temporal sequence of the user's motions; and calculating correlations between the resultant temporal sequence of the user's motions and the avatar's temporal motion sequences. Besides this processing, there is processing for selecting a suitable avatar's motion even when a frequency shift occurs. This processing involves: performing the Fourier transformation on the temporal sequence of the user's motions; performing the Fourier transformation on the templates, similarly; applying the resultant templates to the resultant temporal sequence of the user's motions; performing the inverse Fourier transformation on the template processed temporal sequence of the user's motions; and calculating correlations between the resultant temporal sequence of the user's motions and the avatar's temporal motion sequences. In this case, the processing uses feature quantities $A_i$, $B_i$ and $C_i$ for the respective axes prestored in the avatar motion DB 20.

If there are a huge quantity of avatar's motions stored in the avatar motion DB 20, clustering of the avatar's motions can be effective. More specifically, the avatar's motions are first classified into clusters in temporal sequences, and the median value of each cluster is obtained. Then, one cluster is selected according to the correlation coefficients respectively calculated with the motion feature quantities of the temporal motion sequences having the medium values of the clusters. Thereafter, temporal motion sequences in the selected cluster having the correlation coefficient closest to unity are searched out again.

Example

Figure 13:
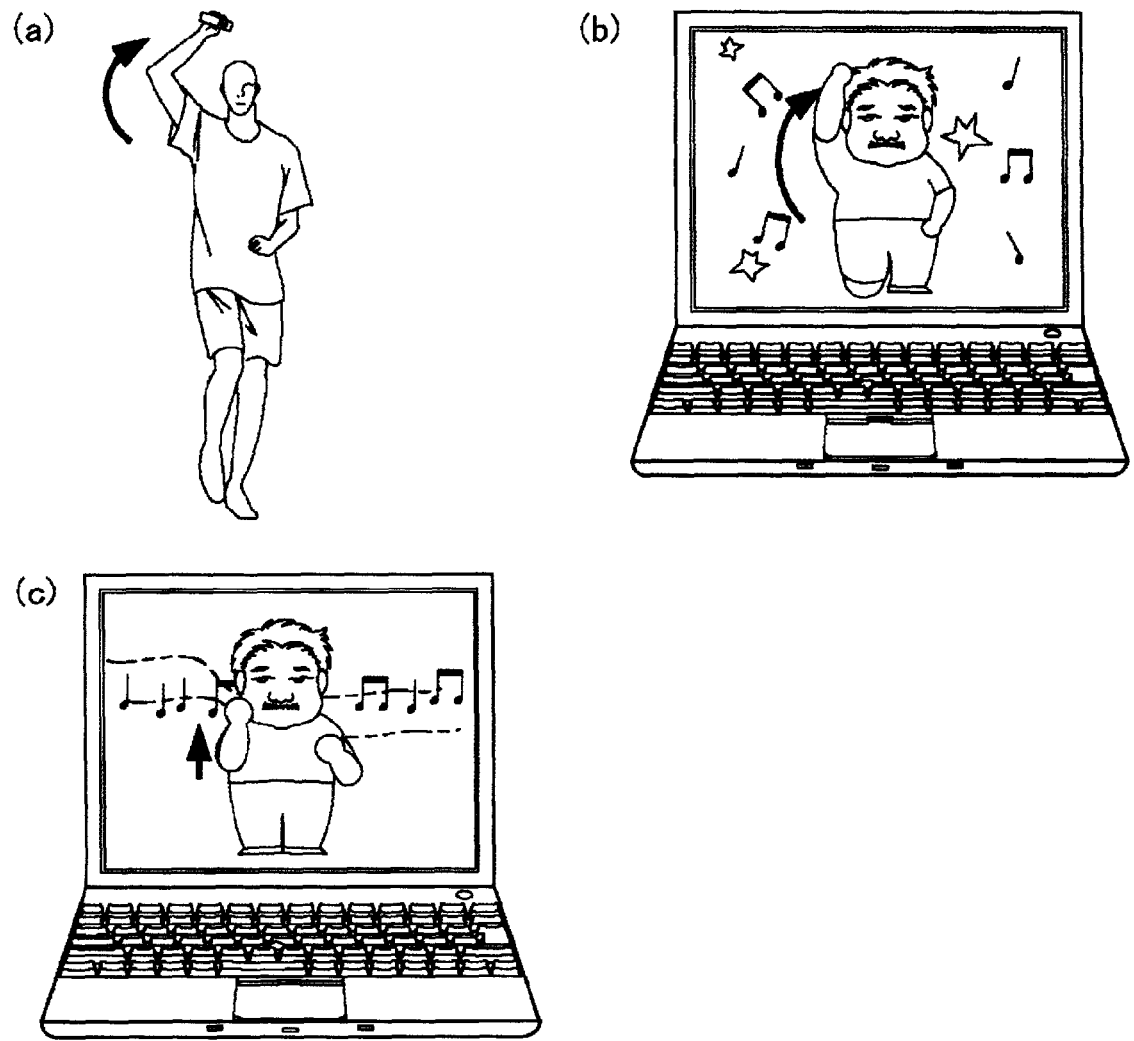
FIGS. 13A to 13C show an example of causing an avatar to make motions along with a change in motions which a user makes to music.

Here, description is provided for an example of an embodiment of causing an avatar to perform motions along with a change in motions which a user performs to music. FIGS. 13A to 13C show an example of causing an avatar to perform motions along with a change in motions which a user makes to music. FIG. 13A shows that the user dances while holding an input device with the right hand and moving the right hand up and down. When the music is exciting in the "chorus," the high frequency components of the user's motion feature quantities are weighted by the templates to select motions in which the avatar moves the right hand energetically up and down as shown in FIG. 13B. On the other hand, when the music is calm in the "ending," the low frequency components of the user's motion feature quantities are weighted by the templates to select motions in which the avatar moves the right hand moderately up and down as shown in FIG. 13C.

Hardware Configuration

Figure 14:
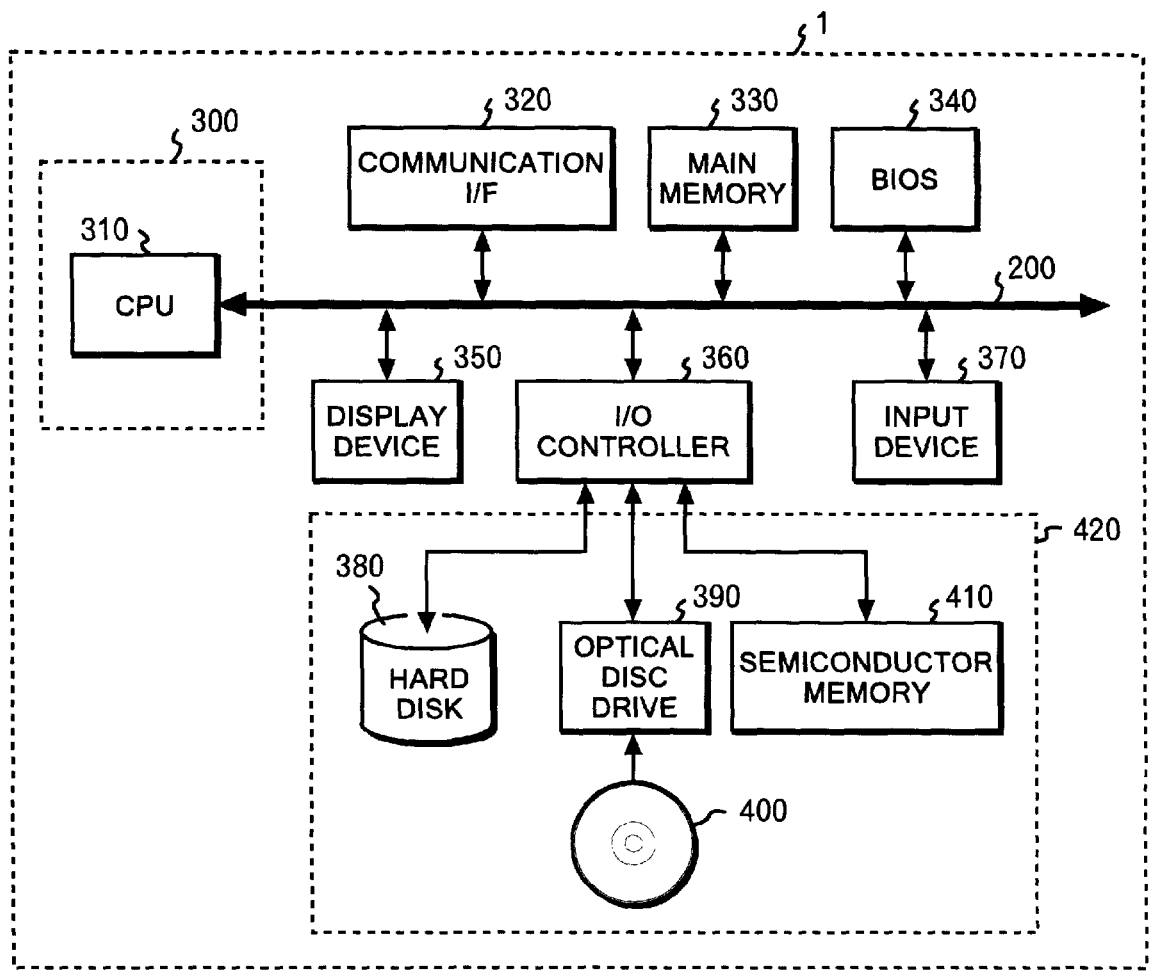
FIG. 14 shows a hardware configuration of the operational object controlling device according to the present embodiment.

FIG. 14 shows a hardware configuration of the operational object controlling device 1 according to the present embodiment. The operational object controlling device 1 includes a central processing unit (CPU) 310 constituting a controller 300, a bus line 200, a communication interface (I/F) 320, a main memory 330, a basic input output system (BIOS) 340, a display device 350, an input/output (I/O) controller 360, an input device 370 such as a keyboard and mouse, a hard disk 380, an optical disc drive 390, and a semiconductor memory 410. Here, the hard disk 380, the optical disc drive 390 and the semiconductor memory 410 are collectively called a storage device 420.

The controller 300 is a unit for controlling the operational object controlling device 1 overall, and reads and executes various programs stored in the hard disk 380 as needed to implement various functions according to the embodiment of the present invention while collaborating with the described hardware.

The communication I/F 320 is a network adapter for allowing the operational object controlling device 1 to receive and transmit information from and to other devices through a communication network. The communication I/F 320 can include a modem, a cable modem and Ethernet (trade mark) adapter. However, if the operational object controlling device 1 does not perform communications, the communication I/F 320 is not needed.

The BIOS 340 stores a boot program to be executed by the CPU 310 at the start-up time of the operational object controlling device 1, a hardware-dependant program of the operational object controlling device 1, and other programs.

The display device 350 includes a display device such as a cathode-ray tube display device (CRT) or a liquid crystal display device.

The storage device 420 such as the hard disk 380, the optical disc drive 390 and the semiconductor memory 410 can be connected to the I/O controller 360.

The input device 370 is for inputting a user's motions and is equivalent to a motion detecting unit.

The hard disk 380 stores various programs for causing the hardware to function as the operational object controlling device 1, a program for implementing the functions of the present invention, and tables and records. The operational object controlling device 1 can use as an external storage device a hard disk (not shown) additionally installed outside the device 1.

A DVD-ROM drive, a CD-ROM drive, a DVD-RAM drive or a CD-RAM drive, for example, can be used in place of the optical disc drive 390. In this case, the disc 400 corresponding to each of the drives is used. It is also possible to provide a program or data to the main memory 330 or the hard disk 380 through the I/O controller 360 after reading the program or data from the optical disc 400 through the optical disc drive 390.

Note that a computer in this present invention is an information processing apparatus including the storage device 420, the CPU 310 and the like, and that the operational object controlling device 1 is configured as an information processing apparatus including the storage device 420, the CPU 310 and the like. This information processing apparatus corresponds to the computer of the embodiment of the present invention.

In addition, the operational object controlling device 1 can be implemented by use of any of various terminals such as a mobile phone, a PDA (personal data assistant) and a gaming device as long as the principle of the embodiment of the present invention is applicable to the terminal.

According to the present invention, provided are an operational object controlling device and method that are capable of easily reflecting a user's motions in motions of an operational object after modifying the user's motions, thereby allowing the user to feel united with the operational object, and causing the operational object to perform various motions.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An operational object controlling device that detects a motion of at least one part of the body of a user and selects a motion for an operational object according to the detected motion, the device comprising:
   a motion detecting unit for detecting the user's motions;
   a motion obtaining unit for obtaining the user's motion from the motions detected by the motion detecting unit at a plurality of predetermined intervals;
   a motion feature quantities extraction unit for extracting the user's motion feature quantities each of which is defined by one of frequency components obtained by applying a Fourier transformation on a temporal sequence of the user's motions obtained by the motion obtaining unit;
   a template storage unit for storing the templates which weight the frequency components of the user's motion feature quantities;
   an operational object motion storage unit for storing the temporal motion sequences of the operational object;
   a motion feature quantities transform unit for transforming the user's motion feature quantities, by use of a template that is obtained from the template storage unit according to environmental information of the user or the operational object; and an operational object motion obtaining unit for selecting one of the temporal motion sequences of the operational object in the operational object motion storage unit that has motion feature quantities close to the user's motion feature quantities transformed by the motion feature quantities transform unit.

2. The operational object controlling device according to claim 1, wherein the operational object motion obtaining unit:
calculates a correlation coefficient between each of the temporal motion sequences stored in the operational object motion storage unit, and temporal motion sequences obtained by performing an inverse frequency transform on the user's motion feature quantities weighted by the motion feature quantities transform unit; and
obtains temporal motion sequences having the correlation coefficient closest to unity from among the temporal motion sequences stored in the operational object motion storage unit.

3. The operational object controlling device according to claim 1, wherein the motion feature quantities transform unit performs a frequency transform on the template and then uses the transformed template.

4. The operational object controlling device according to claim 1, wherein each of the motions of the operational object is represented in a tree structure having at least one motion point.

5. The operational object controlling device according to claim 4, wherein the operational object motion storage unit and the template storage unit are relational databases or databases in the Extensible Markup Language (XML).

6. The operational object controlling device according to claim 1,
wherein the environmental information of the user or the operational object is information on a musical piece played while the user performs motions, and
wherein the operational object controlling device further comprising a music information storage unit in which the information on the musical piece is stored.

7. The operational object controlling device according to claim 6, wherein each of the predetermined intervals at which the user's motion is obtained is equivalent to one segment of a single measure where the single measure is divided by an integer equal to at least one.

8. An operational object selecting method of detecting a motion of at least one part of the body of a user and of selecting a motion of an operational object according to the detected motion, the method comprising the steps of:
obtaining a motion of the user for each of a plurality of predetermined intervals;
extracting the user's motion feature quantities each of which is defined by one of frequency components obtained by performing a frequency transform on temporal motion sequences of the user;
obtaining a template of a plurality of templates based on environmental information of the user or the operational object, wherein the templates having been previously stored weight the frequency components of the user's motion feature quantities;
transforming the user's motion feature quantities by use of the template; and
obtaining temporal motion sequences of the operational object that has motion feature quantities close to the user's motion feature quantities thus transformed, the motion feature quantities of the operational object being based on each of the temporal motion sequences of the operational object previously stored.

9. The method according to claim 8, further comprising the steps of:
calculating a correlation coefficient between each of the previously-stored temporal motion sequences of the operational object, and temporal motion sequences obtained by performing an inverse frequency transform on the weighted user's motion feature quantities; and
obtaining one of the temporal motion sequences of the operational object that has the correlation coefficient closest to unity.

10. The method according to claim 8, wherein the template is subjected to the frequency transform and then is used to transform the motion feature quantities.

11. The method according to claim 8, wherein each of the motions of the operational object is represented in a tree structure having at least one motion point.

12. The method according to claim 8, wherein the environmental information of the user or the operational object is information on a musical piece played while the user performs motions.

13. The method according to claim 12, wherein each of the predetermined intervals at which the user's motion is obtained is equivalent to one segment of a single measure where the single measure is divided by one or more.

14. A computer readable article of manufacture tangibly embodying computer readable instructions for executing a computer implemented method for causing a computer to detect a motion of at least one part of the body of a user and for selecting a motion of an operational object according to the detected motion, the method comprising the steps of:
obtaining a motion of the user for each predetermined interval;
extracting the user's motion feature quantities each of which is defined by one of frequency components obtained by performing a frequency transform on temporal motion sequences of the user;
obtaining a template of a plurality of templates based on environmental information of the user or the operational object, the templates having been previously stored weight the frequency components of the user's motion feature quantities,
transforming the user's motion feature quantities by use of the template, and
obtaining temporal motion sequences of the operational object that has motion feature quantities close to the user's motion feature quantities thus transformed, the motion feature quantities of the operational object being figured out based on each of the temporal motion sequences of the operational object previously stored.

15. The computer readable article of manufacture tangibly embodying computer readable instructions for executing a computer implemented method according to claim 14, the method further comprising:
calculating a correlation coefficient between each of the temporal motion sequences stored in the operational object motion storage unit, and temporal motion sequences obtained by performing an inverse frequency transform on the weighted user's motion feature quantities; and
obtaining one of the temporal motion sequences of the operational object that has the correlation coefficient closest to unity.

16. The method according to claim 14, wherein the template is subjected to the frequency transform and then is used to transform the motion feature quantities.

17. The method according to claim 14, wherein each of the motions of the operational object is represented in a tree structure having at least one motion point.

18. The method according to claim 14, wherein the environmental information of the user or the operational object is information on a musical piece played while the user performs motions.

19. The method according to claim 18, wherein each of the predetermined intervals at which the user's motion is obtained is equivalent to one segment of a single measure where the single measure is divided by one or more.

* * * * *